(12) United States Patent
Bortolon

(10) Patent No.: US 6,364,047 B1
(45) Date of Patent: Apr. 2, 2002

(54) ADJUSTABLE PEDAL ASSEMBLY—FLOATING FLOOR

(75) Inventor: Christopher A. Bortolon, Clawson, MI (US)

(73) Assignee: Teleflex Incorporated, Plymouth Meeting, PA (US)

( * ) Notice: Subject to any disclaimer, the term of this patent is extended or adjusted under 35 U.S.C. 154(b) by 0 days.

(21) Appl. No.: 09/670,771

(22) Filed: Sep. 27, 2000

(51) Int. Cl.$^7$ .............................. B60K 26/00; B62D 1/16
(52) U.S. Cl. ............................ 180/334; 74/512; 74/513
(58) Field of Search .................................. 180/334, 326, 180/329; 74/513, 514, 512; 192/219.7

(56) References Cited

U.S. PATENT DOCUMENTS

| | | | |
|---|---|---|---|
| 1,994,699 A | * 3/1935 | Gehbauer | |
| 2,032,157 A | 3/1936 | Dresser et al. ................. 296/75 |
| 2,491,898 A | 12/1949 | Luketa ........................ 155/105 |
| 2,873,616 A | 2/1959 | Schilling ...................... 74/478 |
| 2,944,439 A | 7/1960 | Dalton ......................... 74/562 |
| 3,059,960 A | 10/1962 | Komorowski et al. ......... 296/65 |
| 3,602,181 A | 8/1971 | Harris ......................... 114/153 |
| 3,630,326 A | 12/1971 | Kawaguchi ................... 74/478 |
| 4,180,812 A | 12/1979 | Kaltenbach et al. ......... 340/706 |
| 4,470,570 A | 9/1984 | Sakurai et al. ............... 244/235 |
| 4,499,963 A | * 2/1985 | Liston ......................... 180/90.6 |
| 4,683,977 A | 8/1987 | Salmon ....................... 180/334 |
| 4,702,713 A | 10/1987 | Lee .............................. 440/7 |
| 4,848,708 A | 7/1989 | Farrell et al. ................ 244/235 |
| 4,870,871 A | 10/1989 | Ivan ............................. 74/513 |
| 4,915,075 A | * 4/1990 | Brown ......................... 123/399 |
| 4,958,607 A | 9/1990 | Lundberg .................... 123/377 |
| 4,989,474 A | 2/1991 | Cicotte et al. ................. 74/512 |
| 5,010,782 A | 4/1991 | Asano et al. ................. 74/512 |
| 5,078,024 A | 1/1992 | Cicotte et al. ................. 74/512 |
| 5,086,663 A | 2/1992 | Asano et al. ................. 74/512 |
| 5,106,121 A | * 4/1992 | Boone ......................... 280/807 |
| 5,152,703 A | * 10/1992 | Clement ........................ 440/7 |
| 5,309,361 A | 5/1994 | Drott et al. .............. 364/424.1 |
| 5,438,516 A | * 8/1995 | Neubauer et al. ............. 701/70 |
| 5,460,061 A | 10/1995 | Redding et al. .............. 74/512 |
| 5,465,633 A | 11/1995 | Bernloehr .................... 74/512 |
| 5,583,407 A | 12/1996 | Yamaguchi ................. 318/551 |
| 5,632,183 A | 5/1997 | Rixon et al. .................. 74/512 |
| 5,722,302 A | 3/1998 | Rixon et al. .................. 74/512 |
| 5,771,752 A | 6/1998 | Cicotte ........................ 74/512 |
| 5,819,593 A | 10/1998 | Rixon et al. .................. 74/514 |
| 5,823,064 A | 10/1998 | Cicotte ........................ 74/512 |
| 5,826,463 A | 10/1998 | Monson ....................... 74/512 |
| 5,884,532 A | 3/1999 | Rixon et al. .................. 74/512 |
| 5,885,143 A | 3/1999 | Ichikawa et al. ........... 451/168 |
| 5,890,399 A | 4/1999 | Rixon et al. .................. 74/512 |
| 6,182,525 B1 | * 2/2001 | Bowers et al. ................ 74/512 |
| 6,220,112 B1 | * 4/2001 | Graham et al. ........... 74/483 R |
| 6,223,623 B1 | * 5/2001 | Vance ......................... 74/513 |

FOREIGN PATENT DOCUMENTS

JP 62050532 * 3/1987

* cited by examiner

Primary Examiner—J. J. Swann
Assistant Examiner—David Divine
(74) Attorney, Agent, or Firm—Howard & Howard

(57) ABSTRACT

An adjustable pedal assembly (10) includes two pedal mechanisms (12 and 14) disposed on a top side (16) of a carrier plate (18). Two parallel tracks (20 and 22) are disposed on a bottom side (24) of the carrier (18) for supporting the carrier (18) for movement between a fore and an aft position. The parallel tracks (20 and 22) are spaced apart a first distance for minimizing torque when either of the pedal mechanisms (12 and 14) is actuated. Additionally, the pedal mechanisms (12 and 14) are within the first distance separating the tracks (12 and 14). The carrier plate (18) has a periphery (26) extending about and spaced from the parallel tracks (20 and 22) to overlie the peripheral surface (34) of the floorboard (32) and limit access to the recess (36). An adjustment mechanism (28) for adjusting a fore and an aft position of the carrier (18) is disposed on the bottom side (24) of the carrier (18) between the parallel tracks (20 and 22).

15 Claims, 2 Drawing Sheets

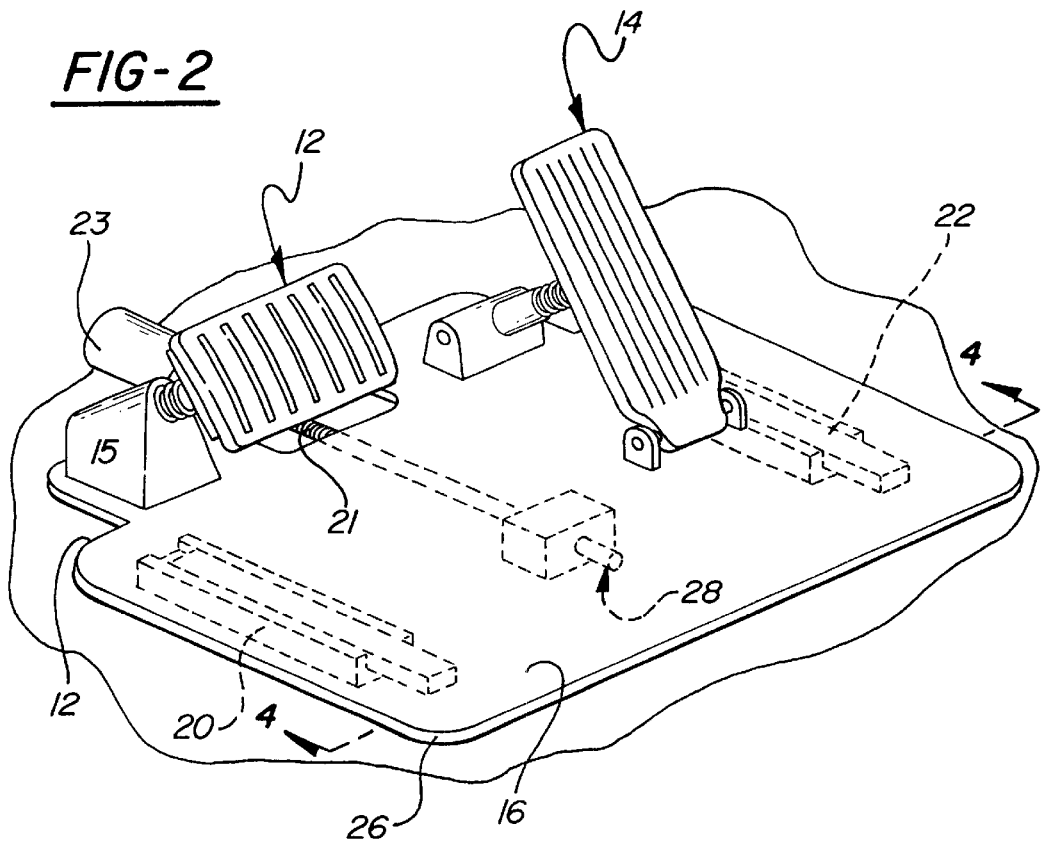
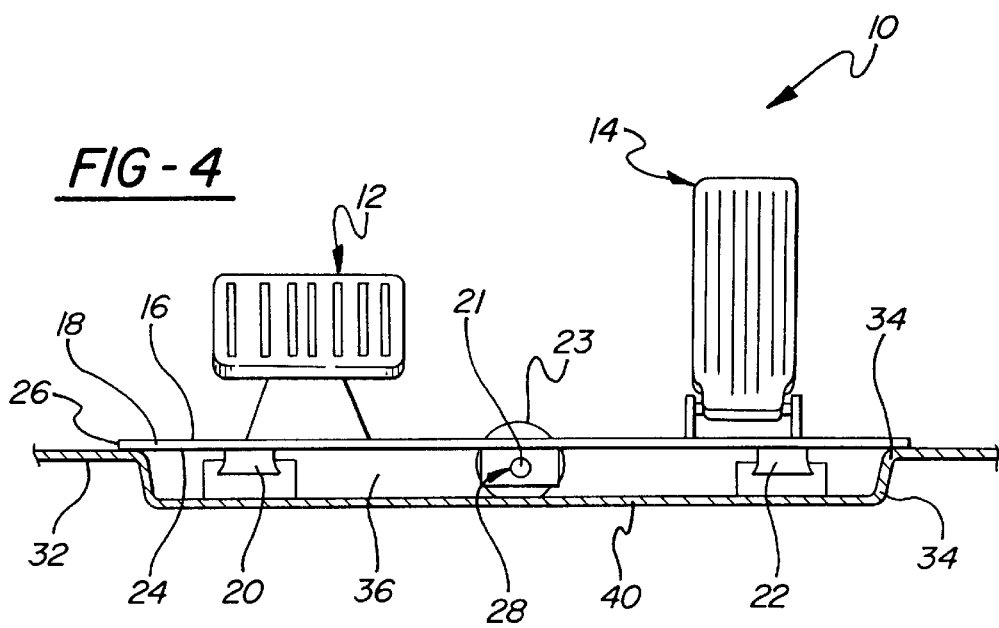

ADJUSTABLE PEDAL ASSEMBLY— FLOATING FLOOR

BACKGROUND OF THE INVENTION

1. Field of the Invention

The subject invention relates to an adjustable pedal assembly.

2. Description of the Prior Art

Various adjustable pedal assemblies are well known in the prior art which include a carrier, a plurality of pedal mechanisms disposed on the carrier, an adjustment mechanism disposed on the carrier and a track that movably supports the carrier in fore and aft positions. An example of such a pedal assembly is disclosed in U.S. Pat. No. 2,873,616 to Schilling.

The Schilling patent discloses an adjustable pedal assembly having a carrier with a plurality of pedal mechanisms disposed on opposite sides of a periphery of the carrier. A track is disposed on the carrier for movably supporting the carrier in a fore and an aft position. Additionally, an adjustment mechanism is disposed on the carrier for adjusting the fore and aft position of the carrier. When a user actuates one of the pedal mechanisms a torque is introduced which creates instability in the assembly as disclosed in the Schilling patent.

It is desirable to provide an adjustable pedal assembly to minimize the torque introduced into the system when one of the pedal mechanisms is actuated.

SUMMARY OF THE INVENTION AND ADVANTAGES

The invention provides an adjustable pedal assembly comprising a carrier having a top side and a bottom side. A plurality of pedal mechanisms are disposed on the top side of the carrier. An adjustment mechanism is disposed on the bottom side of the carrier for adjusting a fore and an aft position of the carrier. The pedal assembly is characterized by a plurality of parallel tracks disposed on the bottom side of the carrier for supporting the carrier for movement between the fore and aft positions.

Accordingly, the plurality of parallel tracks disposed on the carrier of the subject invention minimizes the torque introduced when a pedal mechanism is actuated. Therefore, the lateral stability of the assembly of the present invention is increased, resulting in improved control by the user. In addition, where the carrier has an upper surface overlying the peripheral surface of a floorboard of a vehicle, thereby limiting access to the recess, foreign objects are prevented from interfering with the operation of the assembly.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a perspective view of the adjustable pedal assembly disposed in the recess of the floorboard of the vehicle;

FIG. 4 is a front view of the adjustable pedal assembly disposed within the recess of the floorboard.

DETAILED DESCRIPTION OF THE PREFERRED EMBODIMENT

Figure 1:
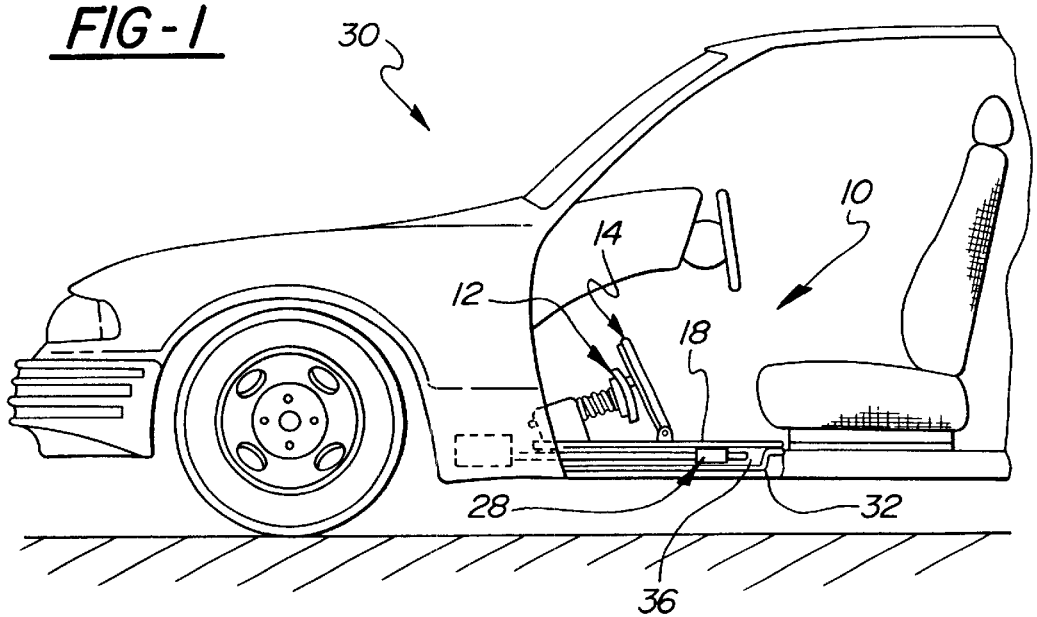
FIG. 1 is a side elevational view of the vehicle wherein the adjustable pedal assembly is installed.

Referring to the Figures, wherein like numerals indicate like or corresponding parts throughout the several views, an adjustable pedal assembly is generally shown at 10. A plurality of pedal mechanisms, generally indicated at 12 and 14, are disposed on a top side 16 of a carrier or plate 18. An electrical signal generator 15 is associated with each of the pedal mechanisms 12 and 14 and produces electrical output signals in response to movement of the pedal mechanisms 12 and 14. As shown in FIGS. 2 and 4, two pedal mechanisms 12 and 14 are disposed on the top side 16 of the carrier 18.

The pedal assembly 10 is characterized by a plurality of parallel tracks, generally indicated at 20 and 22, disposed on a bottom side 24 of the carrier 18 for supporting the carrier 18 for movement between a fore and an aft position. More specifically, the carrier 18 has a periphery 26 extending about and spaced from the parallel tracks 20 and 22. Referring to FIGS. 2 and 4, two tracks 20 and 22 are disposed on the bottom side 24 of the carrier 18 at a first distance therebetween or apart from one another for minimizing torque when any of the pedal mechanisms 12 and 14 are actuated, and the pedal mechanisms 12 and 14 are disposed on the top side 16 of the carrier 18 within the first distance. An adjustment mechanism, generally indicated at 28, for adjusting a fore and an aft position of the carrier 18 is disposed on the bottom side 24 of the carrier 18 between the parallel tracks 20 and 22. The adjustment mechanism comprises a screw 21 rotated by an electrical motor 23.

Figure 3:
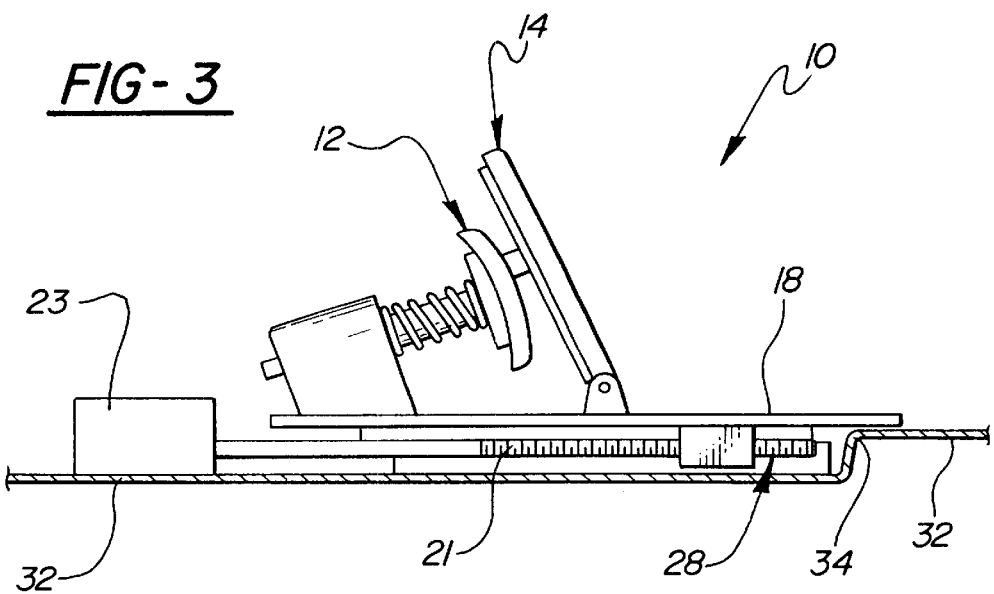
FIG. 3 is a side view of the adjustable pedal assembly.

Referring to FIGS. 1 and 3, a vehicle is generally shown at 30 with a floorboard 32 having a peripheral surface 34 and a recess 36 disposed below the peripheral surface 34. The recess 36 includes sides 38 and a bottom 40 and has the carrier 18 disposed therein. The carrier 18 is moveable within the recess 36 between a fore and an aft position.

The assembly 10 is characterized by a plurality of parallel tracks 20 and 22, interconnecting a bottom side 24 of the carrier 18 and the bottom 40 of the recess 36 for supporting the carrier 18 for movement between the fore and aft positions. The adjustment mechanism 28 is disposed on the bottom side 24 of the carrier 18 between the tracks 20 and 22 for interconnecting the carrier 18 and the bottom 40 of the recess 36 to adjust the fore and aft position of the carrier 18 within the recess 36. As shown in FIG. 4, two tracks 20 and 22 are disposed on the bottom side 24 of the carrier 18 for minimizing torque when any of the pedal mechanisms 12 and 14 are actuated. The tracks 20 and 22 are disposed on the bottom side 24 of the carrier 18 at a first distance apart and the pedal mechanisms 12 and 14 are disposed on the top side 16 of the carrier 18 within the first distance, as shown in FIG. 2. The carrier 18 also has a periphery 26 extending about and spaced from the parallel tracks 20 and 22, whereby the periphery 26 of the carrier 18 overlies at least a portion of the peripheral surface 34 of the floorboard 32. More specifically, the carrier 18 is a plate having an upper surface overlying the peripheral surface 34 of the floorboard 32 to limit access to the recess 36.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty has utility. In addition, the reference numerals in the claims are merely for convenience and are not to be read in any way as limiting.

What is claimed is:

1. An adjustable pedal assembly (10) comprising:
   a carrier (18) having a top side (16) and a bottom side (24);
   a plurality of pedal mechanisms (12, 14) disposed on said top side (16) of said carrier (18); and
   an adjustment mechanism (28) for adjusting a fore and an aft position of said carrier (18);
   said pedal assembly (10) characterized by a plurality of parallel tracks (20, 22) disposed on said bottom side (24) of said carrier (18) for supporting said carrier (18) for movement between said fore and aft positions,
   said carrier (18) having a periphery (26) extending beyond and spaced from said parallel tracks (20, 22).

2. A pedal assembly (10) as set forth in claim 1 further characterized by two of said tracks (20, 22) disposed on said bottom side (24) of said carrier (18) for minimizing torque when any of said pedal mechanisms (12, 14) are actuated.

3. A pedal assembly (10) as set forth in claim 2 further characterized by two of said pedal mechanisms (12, 14) disposed on said top side (16) of said carrier (18).

4. A pedal assembly (10) as set forth in claim 3 further characterized by said tracks (20, 22) disposed on said bottom side (24) of said carrier (18) at a first distance therebetween, said pedal mechanisms (12, 14) disposed on said top side (16) of said carrier (18) within said first distance.

5. A pedal assembly (10) as set forth in claim 4 further characterized by said adjustment mechanism (28) disposed on said bottom side (24) of said carrier (18).

6. A pedal assembly (10) as set forth in claim 5 further characterized by said adjustment mechanism (28) disposed on said bottom side (24) of said carrier (18) between said tracks (20, 22).

7. A pedal assembly (10) as set forth in claim 1 further characterized by including an electrical signal generator associated with each of said pedal mechanisms (12, 14) for providing electrical output signals.

8. A vehicle (30) comprising:
   a floorboard (32) having a peripheral surface (34) and a recess (36) disposed below said peripheral surface (34), wherein said recess (36) includes sides (38) and a bottom (40); and
   a carrier (18) having a top side (16) and a bottom side (24) and disposed within said recess (36),
   a plurality of pedal mechanisms (12, 14) disposed on said top side (16) of said carrier (18),
   an adjustment mechanism (28) interconnecting said carrier (18) and said bottom (40) of said recess (36) for adjusting a fore and an aft position of said carrier (18), and
   said vehicle (30) characterized by a plurality of parallel tracks (20, 22) interconnecting said bottom side (24) of said carrier (18) and said bottom (40) of said recess (36) for supporting said carrier (18) for movement between said fore and aft positions,
   said carrier (18) having a periphery (26) extending beyond and spaced from said parallel tracks (20, 22).

9. A vehicle (30) as set forth in claim 8 further characterized by two of said tracks (20, 22) disposed on said bottom side (24) of said carrier (18) for minimizing torque when any of said pedal mechanisms (12, 14) are actuated.

10. A vehicle (30) as set forth in claim 9 further characterized by two of said pedal mechanisms (12, 14) disposed on said top side (16) of said carrier (18).

11. A vehicle (30) as set forth in claim 10 further characterized by said tracks (20, 22) disposed on said bottom side (24) of said carrier (18) at a first distance therebetween, said pedal mechanisms (12, 14) disposed on said top side (16) of said carrier (18) within said first distance.

12. A vehicle (30) as set forth in claim 11 further characterized by said periphery (26) of said carrier (18) overlying at least a portion of said peripheral surface (34) of said floorboard (32).

13. A vehicle (30) as set forth in claim 11 further characterized by said adjustment mechanism (28) disposed on said bottom side (24) of said carrier (18) between said tracks (20, 22).

14. A vehicle (30) as set forth in claim 8 further characterized by said carrier (18) being a plate having an upper surface overlying said peripheral surface (34) of said floorboard (32) to limit access to said recess (36).

15. A vehicle (30) as set forth in claim 8 further characterized by including an electrical signal generator associated with each of said pedal mechanisms (12, 14) for providing electrical output signals.

* * * * *